DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 9

T883,006

POLYARYLENE ETHER IONOMERS

Derek Morris Holt Waring, Wilmington, Del., assignor to E. I. du Pont de Nemours and Company, Wilmington, Del., a corporation of Delaware

Filed Dec. 15, 1969, Ser. No. 885,302
Int. Cl. C08g *23/00, 23/16*
U.S. Cl. 260—49
No Drawing. 9 Pages Specification

The composition having the recurring unit

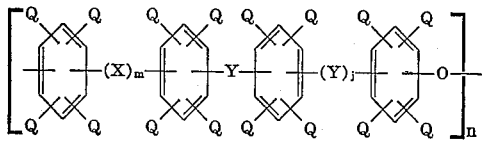

wherein the X, Y and O linkages to the phenylene radicals are in the meta or para positions on the phenylene radicals; $n$ is at least 25; $m$ and $j$ are 1 or 0; X and Y are —O—, —S—, —CO—, —$SO_2$—, —CRR′— in which R is hydrogen, non-ionic aliphatic, cycloaliphatic, or aromatic hydrocarbon radicals or aliphatic, cycloaliphatic or aromatic hydrocarbon radicals substituted with at least one of the following: —$CO_2Z_g$, —NWW′W″W‴$A_g$, —$SO_3Z_g$, and —PWW′W″W‴$A_g$, and in which R′ is R or —$CO_2Z_g$, —NWW′W″W‴$A_g$, —$SO_3Z_g$, or —PWW′W″W‴$A_g$, or —POAr— in which Ar is either a non-ionic aromatic hydrocarbon radical or is an aromatic hydrocarbon radical substituted with at least one of $$-CO_2Z_g,\ -NWW'W''W'''A_g$$

$$-SO_3Z_g,\ \text{and}\ -PWW'W''W'''A_g$$

W, W′, W″, and W‴ are hydrogen, non-ionic aliphatic, cycloaliphatic or aromatic hydrocarbon radicals; Z is a cation; A is an anion; Q may differ within and among the phenylene radicals and is R′ or a halogen; and $g$ is ½ or 1.